United States Patent
Misso et al.

(10) Patent No.: US 6,498,703 B2
(45) Date of Patent: Dec. 24, 2002

(54) INERTIAL SPRING LATCH ASSEMBLY IN A DISC DRIVE

(75) Inventors: Nigel F. Misso, Yukon, OK (US); Steve S. Eckerd, Oklahoma City, OK (US); Roy L. Wood, Yukon, OK (US); John D. Stricklin, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/024,821

(22) Filed: Dec. 18, 2001

(65) Prior Publication Data

US 2002/0054456 A1 May 9, 2002

Related U.S. Application Data

(63) Continuation of application No. 09/353,405, filed on Jul. 15, 1999.
(60) Provisional application No. 60/133,834, filed on May 12, 1999.

(51) Int. Cl.⁷ ................................................. G11B 5/54
(52) U.S. Cl. ................................................. 360/256.4
(58) Field of Search ....................................... 360/256.4

(56) References Cited

U.S. PATENT DOCUMENTS

| | | |
|---|---|---|
| 4,635,151 A | 1/1987 | Hazebrouck |
| 4,890,176 A | 12/1989 | Casey et al. |
| 4,937,692 A | 6/1990 | Okutsu |
| 4,949,206 A | 8/1990 | Phillips et al. |
| 5,134,608 A | 7/1992 | Strickler et al. |
| 5,187,627 A | 2/1993 | Hickox et al. |
| 5,224,000 A | 6/1993 | Casey et al. |
| 5,231,556 A | 7/1993 | Blanks |
| 5,528,437 A | 6/1996 | Mastache |
| 5,600,516 A | 2/1997 | Phillips et al. |
| 5,612,842 A | 3/1997 | Hickox et al. |
| 5,636,090 A | 6/1997 | Boigenzahn et al. |
| 5,715,119 A | 2/1998 | Williams et al. |
| 5,734,527 A | 3/1998 | Reinhart |
| 5,812,345 A | 9/1998 | MacPherson et al. |
| 5,905,606 A | 5/1999 | Johnson et al. |
| 5,973,888 A | 10/1999 | Chawanya et al. |
| 6,163,440 A * | 12/2000 | Takahashi et al. ....... 360/256.4 |
| 6,327,119 B1 * | 12/2001 | Barina et al. ............ 360/256.4 |

* cited by examiner

Primary Examiner—George J. Letscher
(74) Attorney, Agent, or Firm—Fellers, Snider, et al.

(57) ABSTRACT

An inertial spring latch with a contact post is disclosed for use in latching an actuator assembly of a data storage device. The actuator assembly includes a contact arm that cooperates with the contact post to restrict movement of the actuator assembly when the data storage device is in a non-operating mode. The inertial spring latch includes a latch body adjacent the actuator assembly, a forward arm extending in a first direction from the latch body and a spring member extending from the forward arm, the spring member supporting the contact post. The contact post inhibits movement of the actuator assembly by decelerating the movement of the actuator assembly upon impact of the contact arm with the contact post. Both the contact post and the spring member deflect to dampen the energy of motion of the actuator assembly, upon impact of the contact arm with the contact post.

22 Claims, 4 Drawing Sheets

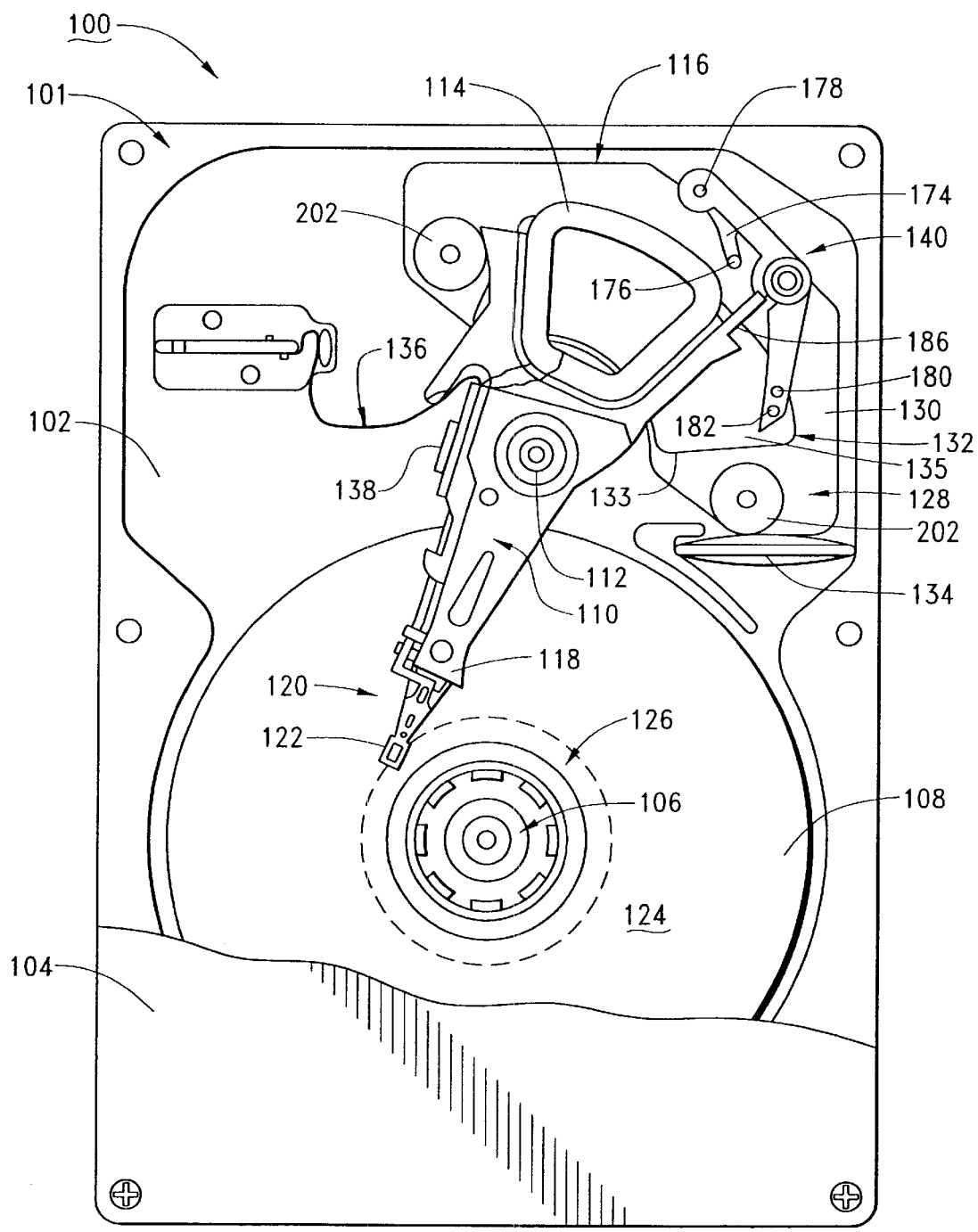
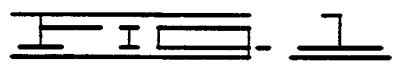

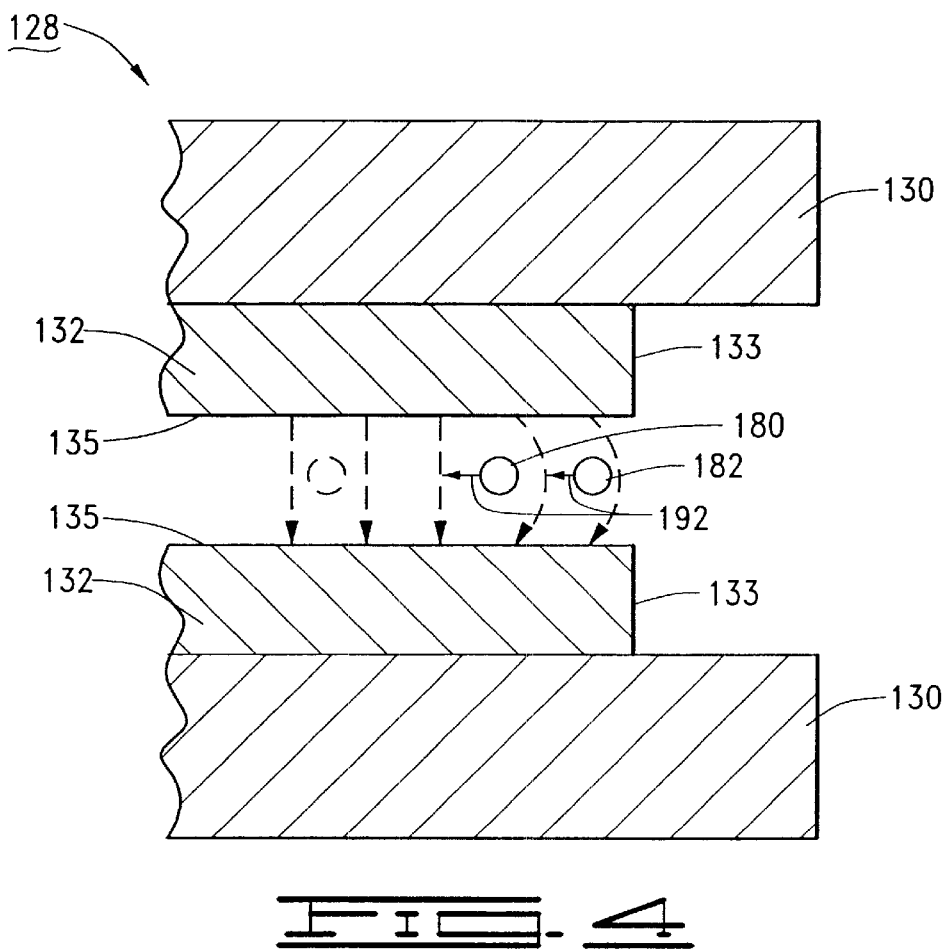
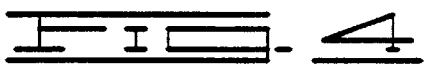
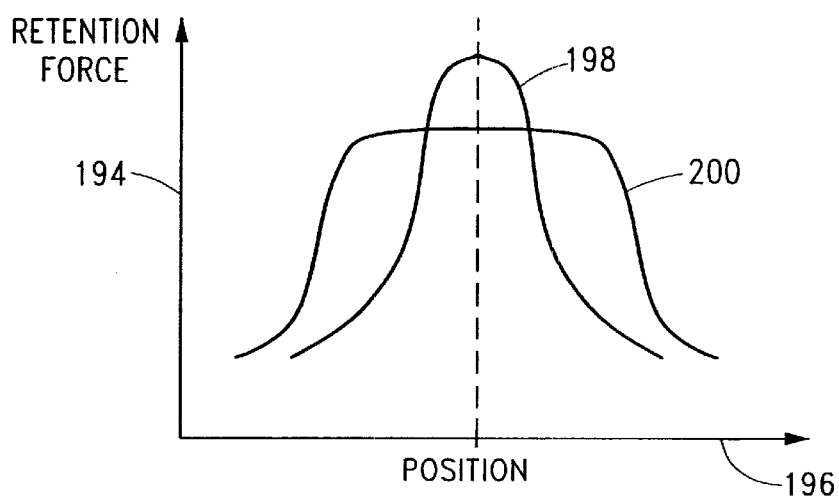
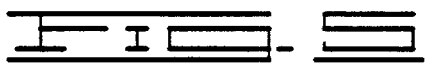

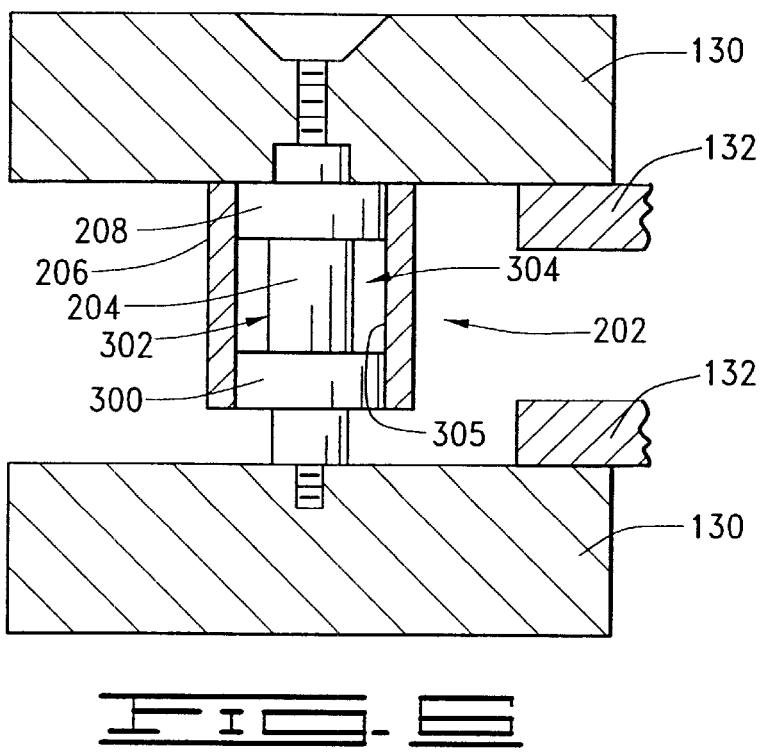
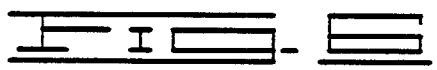
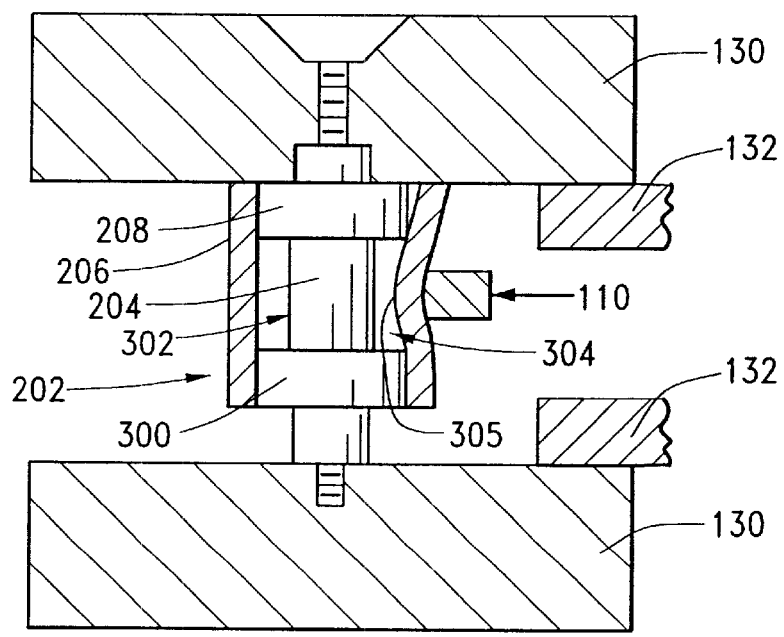
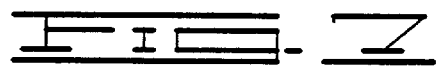

INERTIAL SPRING LATCH ASSEMBLY IN A DISC DRIVE

RELATED APPLICATIONS

This application is a divisional of copending U.S. patent application, Ser. No. 09/353,405 filed Jul. 15, 1999 and claims the benefit of U.S. Provisional Patent Application No. 60/133,834 filed May 12, 1999.

FIELD OF THE INVENTION

The present invention relates generally to the field of disc drive data storage devices, and more particularly but not by way of limitation, to an inertial spring latch assembly for limiting the movement of an actuator while dissipating energy following contact of the actuator with the inertial spring latch assembly in a data storage device.

BACKGROUND OF THE INVENTION

Disc drives are data storage devices that enable users to rapidly store and retrieve data. Typically, a head/disc assembly (HDA), which houses requisite mechanical portions of the drive and a printed wiring assembly (PWA), which supports requisite electronic portions of the drive comprise a disc drive.

The HDA includes a base deck to which various components are mounted and a top cover cooperating with the base deck to form a sealed housing to reduce particulate contamination. Within the housing, a disc stack is typically formed from a recording disc axially aligned about a spindle motor that rotates the recording disc at a constant, high speed, such as 10,000 revolutions per minute during normal disc drive operation.

A rotary actuator assembly is mounted adjacent the disc stack and includes a ridged arm supporting a flexible suspension assembly, which in turn supports a read/write head communicating with a recording surface of the disc.

The read/write head is typically position-controlled over a pre-selected data track of the recording surface through the interaction of the actuator assembly and a voice coil motor. For data storage devices utilizing magnetoresistive head technology, the read/write head typically includes a thin-film inductive write element to write data to the recording surface and a magneto-resistive (MR) read element to read previously written data from the recording surface.

When the disc drive is not in use, the read/write head is typically landed and brought to rest in a parking zone, which is generally located near the inner diameter of the recording surface. In landing the read/write head, the read/write head is flown over the parking zone and the rotation of the spindle motor is stopped.

Once the heads are positioned in the parking zone, it is typically advantageous to secure the actuator assembly by a latching arrangement to prevent the read/write head from subsequently moving out onto the data storage zone of the disc while the disc drive is non-operational. Latching arrangements are generally practiced in the art and have included various configurations of springs, solenoids and magnets to secure and release the actuator. For example, see U.S. Pat. No. 5,187,627 issued Feb. 16, 1993, to Hickox et al; U.S. Pat. No. 5,224,000 issued Jun. 29, 1993, to Casey et al; and U.S. Pat. No. 5,231,556 issued Jul. 27, 1993, to Blanks.

While operable, such prior art latching systems suffer from several limitations. Mechanical latches typically are complex while electromechanical latches require substantial electrical power to operate. Many magnetic latches with open magnetic circuits exert considerable force when the actuator is near the magnetic latch, while the read/write head remains over the data region, thus resulting in increased power consumption. Moreover, such force can limit the maximum holding force generated by the latch.

Still other prior art latches such as inertial latching mechanisms can be ineffective upon application of a mechanical shock to the system. In particular, the contact surfaces of the latch mechanism and the moving portion of the actuator are encouraged in opposing directions in response to applied mechanical shocks. Therefore, the accelerations imparted to the latching mechanism and to the moving portion of the actuator can cause the contact surfaces to meet with a greater degree of force, resulting in "bounce" at the contact surface, which tends to overcome the latching mechanism and thereby disengage the latching mechanism.

In conjunction with providing effective latching of the actuator as the disc drive comes into the non-operational mode, it is often advantageous to limit the actuator movement to prevent inadvertent actuator arm/gimbal assembly and disc contact. It is generally important to control the extent of actuator travel relative to the non-data zones; otherwise, an actuator that travels beyond the desired extent of radial travel likely results in damage to the read/write head. The inner extent of radial travel allows the read/write head to travel inwardly past the inner most data track to the landing zone where the read/write head can be parked on the disc surface when the disc drive is inoperable. Inward travel beyond this inner extent of travel can result in damaging contact of the read/write head with a hub of the spindle motor. The outer extent of radial travel allows the read/write head to access the outer most data track of the recording surface. Outward travel beyond this outer extent of travel can result in the read/write head moving beyond the outer edge of the data disc, which can damage and disable the read/write head.

As requirements for faster data processing demand ever increasing actuator speed and associated deceleration rates during seek cycles, the likelihood of overshooting the target track increases. Such an overshoot near the extents of travel can result in damage to the read/write head. Also, control circuit errors are known to create "runaway" conditions of the actuator wherein the actuator fails to decelerate at the appointed time. To protect the read/write head from catastrophic failure, it is well known and practiced in the art to employ positive stops which limit the actuator travel to locations only between the desired extents of travel.

In providing such a positive stop, or limit stop, it is necessary that the limit stop decelerate the actuator quickly and in a short distance, but without damaging the actuator assembly. Applying a general dampened braking impulse is known in the art, such as by the use of an air cylinder type dampener as taught by U.S. Pat. No. 4,937,692 issued to Okutsu. In this approach fluid is displaced by a piston that is responsive to a stop member that obstructs the movement of the actuator beyond the desired extent of travel. The dampened braking impulse provides a resistive force for decelerating the actuator, but without the typical sudden deceleration of a rigid stop member, such as a rigid stop pin.

Manufacturability and cost constraints have urged the art toward more simple mechanisms. The use of a resilient pad is widely known, such as that of the teaching of U.S. Pat. No. 4,890,176 issued to Casey et al. and assigned to the assignee of the present invention. Spring members, too, are widely used in the art, such as that according to the teaching of U.S. Pat. No. 4,635,151 issued to Hazebrouck. The primary objection to resilient pads and springs, however, is the relatively long stopping distances necessary to compress the responsive member sufficiently so as to develop an effective braking force.

One attempted solution is to provide a preload force to the resilient member, such as is taught by U.S. Pat. No. 4,949,206 issued to Phillips et al. Another approach is to provide cantilever members that elastically deflect in response to the impact force of the actuator, such as is taught by U.S. Pat. No. 5,134,608 issued to Strickler and U.S. Pat. No. 5,600,516 issued to Phillips et al. and assigned to the assignee of the present invention. Where the resilient member provides a superior initial impact response in not significantly increasing the peak deceleration rate, the relatively large amount of disc space necessarily reserved for stopping distance runs counter to the efforts in maximizing disc space utilization.

Consequently, there has not been available a latching device nor a limit stop which will universally meet the ever increasing demands of disc latching and actuator movement control in reducing the susceptibility of damage to the disc drive. It is to such ends that the present invention is directed.

SUMMARY OF THE INVENTION

As exemplified by preferred embodiments, an inertial spring latch with a contact post is used for latching an actuator assembly of a data storage device. The actuator assembly includes a contact arm that cooperates with the contact post to restrict movement of the actuator assembly when the data storage device is in a non-operating mode. The inertial spring latch comprises a latch body adjacent the actuator assembly, a forward arm extending in a first direction from the latch body and a spring member extending from the forward arm, the spring member supporting the contact post. The contact post inhibits movement of the actuator assembly upon contact of the contact arm with contact post and decelerates movement of the actuator assembly by deflecting upon impact of the contact arm with the contact post. In addition to the deflection of the contact post, the spring member also deflects upon impact of the contact arm with the contact post. The deflection of both the contact post and the spring member controllably decelerates the movement of the actuator by damping the energy of motion of the actuator assembly upon impact of the contact arm with the contact post.

The advantages and features of the present invention will be apparent from the following description when read in conjunction with the drawings and appended claims.

BRIEF DESCRIPTION OF THE DRAWINGS

FIG. 1 is a top plan view of a disc drive constructed in accordance with preferred embodiments of the present invention.

FIG. 4 is a diagrammatical view showing the effect of providing two ferromagnetic members at the trailing arm of the inertial spring latch assembly of FIG. 1.

FIG. 5 is a graphical representation of the retention force in relation to the number of ferromagnetic members in the inertial spring latch assembly of FIG. 1.

FIG. 6 is a cross-sectional elevational view of the compressive limit stop of FIG. 1.

FIG. 7 is a cross-sectional elevational view of the compressive limit stop upon contact by an actuator assembly of FIG. 1.

DETAILED DESCRIPTION

Figure 2:
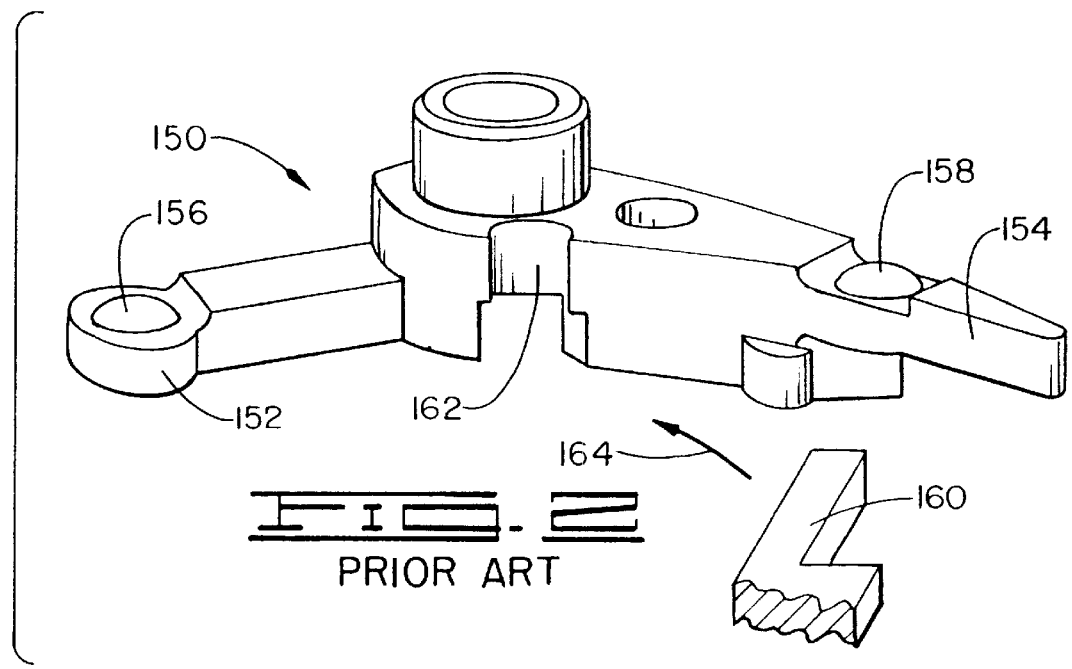
FIG. 2 is a perspective view of a prior art actuator assembly.

In accordance with preferred embodiments of the present invention, reference is first made to FIG. 1, which shows a top plan view of a data storage device 100 used to store computer data. The data storage device 100 is formed of two primary assemblies: a head/disc assembly (HDA) 101, which is composed substantially of all the mechanical portions of the disc drive, and a printed wiring assembly (PWA) which supports electronics that to control the operation of the HDA. The PWA is mounted to the underside of the HDA 101 and is thus not visible in FIG. 1.

The HDA 101 includes a base deck 102 to which various disc drive components are mounted. A top cover 104, shown in partial cutaway fashion, cooperates with the base deck 102 to form a sealed housing for the HDA 101. A spindle motor 106 is provided to rotate a disc 108 at a constant high speed during normal disc drive operation.

To access the disc 108, a controllably positionable actuator assembly 110 (also referred to as an "E-block") is provided which rotates via a cartridge bearing assembly 112 in response to currents applied to an actuator coil 114 of a voice coil motor assembly (VCM), a portion of which is shown at 116. The E-block 110 includes an actuator arm 118 that supports a flexible suspension assembly 120. The flexible suspension assembly 120 extends to support a read/write head 122 adjacent the disc 108. The read/write head 122 is preferably characterized as magneto-resistive (MR), in that the read/write head 122 includes a thin film inductive write element and an MR read element.

The discs 108 have a data recording location with a data recording surface 124, also referred to as recording surface 124. The recording surface 124 is bounded at an inner extent by a circular landing zone 126 where the read/write head 122 can come to rest against the discs 108 at times when the data storage device 100 is not in operation.

The term "servoing", also referred to as position-controlling, as used herein means maintaining control of the read/write head 122 relative to the recording surface 124 during operation of the data storage device 100. Servoing to a data track (not shown) or servoing on the data track, the actuator assembly 110 is controllably positioned by the voice coil motor assembly 116. The voice coil motor assembly 116 includes the actuator coil 114 immersed in a magnetic field generated by a magnet assembly 128. The magnet assembly 128 includes a pair of steel plates 130, only one shown (also called a pole pieces) mounted above and below the actuator coil 114 and a magnet 132 secured to one of the pair of pole pieces 130. The pole pieces 130 provide a magnetically permeable flux path for a magnetic circuit of the voice coil motor assembly 116. During operation of the data storage device 100, current passes through the actuator coil 114 forming an electromagnetic field, which interacts with the magnetic circuit of the voice coil motor assembly 116 causing the actuator coil 114 to move relative to the magnet assembly 128. As the actuator coil 114 moves, the actuator assembly 110 pivots about the bearing assembly 112, causing the read/write head 122 to move over the recording surface 124, thereby allowing the read/write head 122 to interact with the data tracks of the recording surfaces 124.

When attached to the pole piece 130, the magnet 132 presents an edge 133, which lies in a plane substantially perpendicular to a plane defining a plane of the recording surface 124. The magnet 132, when attached to the pole piece 130, also presents a surface 135 lying in a plane substantially parallel to the plane defining the recording surface 124 and perpendicular to the edge 133. The shape of the magnet 132 is configured to provide lines of magnetic flux substantially perpendicular to magnetic flux lines produced by current passes through the actuator coil 114, which forms the electromagnetic field. It is noted that the maximum intensity of the magnetic field generated by the magnet and channeled by the pole pieces occurs at the edge 133 of the magnet 132.

A re-circulation air filter 134 filters out airborne particulate contamination as air is channeled from the rotating discs 108 to cool the actuator coil 114. A flex circuit assembly 136 facilitates electrical communication between the actuator assembly 110 and the disc drive PWA. The flex circuit assembly 136 includes a preamplifier/driver circuit 138 which applies read bias and write currents to the read/write head 122.

Of particular interest is an inertial spring latch assembly 140, also referred to herein as an actuator latch 140, which latches the actuator assembly 110 when the data storage device 100 is deactivated so that the read/write head 122 is brought to rest upon texturized landing zones 126 near the innermost diameters of the discs 108. The actuator latch 140 will be described in further detail below.

Referring now to FIG. 2, shown therein is a prior art actuator latch as exemplified by U.S. Pat. No. 5,734,527 issued to Reinhart. As shown, the actuator latch 150 comprises a forward arm 152 and a trailing arm 154. Magnetic members 156, 158 are attached to or molded into the forward arm 152 and the trailing arm 154, respectively. When the head assemblies (not shown) are moved to their landing zones, an actuator 160 engages with the wall of a recess 162 in the actuator latch 150, thereby urging the actuator latch 150 to its latched position. The direction of the movement of the actuator 160 is shown as line 164. The force required to latch is provided by the attraction of the magnetic member 156 to the fringe field of the VCM magnet (not shown). That is, the magnetic member 156 is disposed proximate opposing edges of the permanent magnets (not shown) of the VCM (not shown).

To unlatch the actuator latch 150, the actuator 160 is powered to move towards the recording surfaces at the outer diameters of the discs whereby the actuator 160 engages the recess 162, which urges the actuator latch 150 to unlatch. The actuator coil (not shown) must be powered to overcome the magnetic detent force holding the actuator latch 150 in its latched position to effectively unlatch the actuator latch 150. As the actuator is unlatched, the member 158 moves to a position proximate opposing edges of the permanent magnets of the VCM to hold the latch 150 in the unlatched position. It should be noted, however, that upon the application of a non-operational mechanical shock, the magnetic member 156 may prove insufficient in maintaining the latch in the latched position as a significant mechanical shock may overcome the magnetic attraction.

Figure 3:
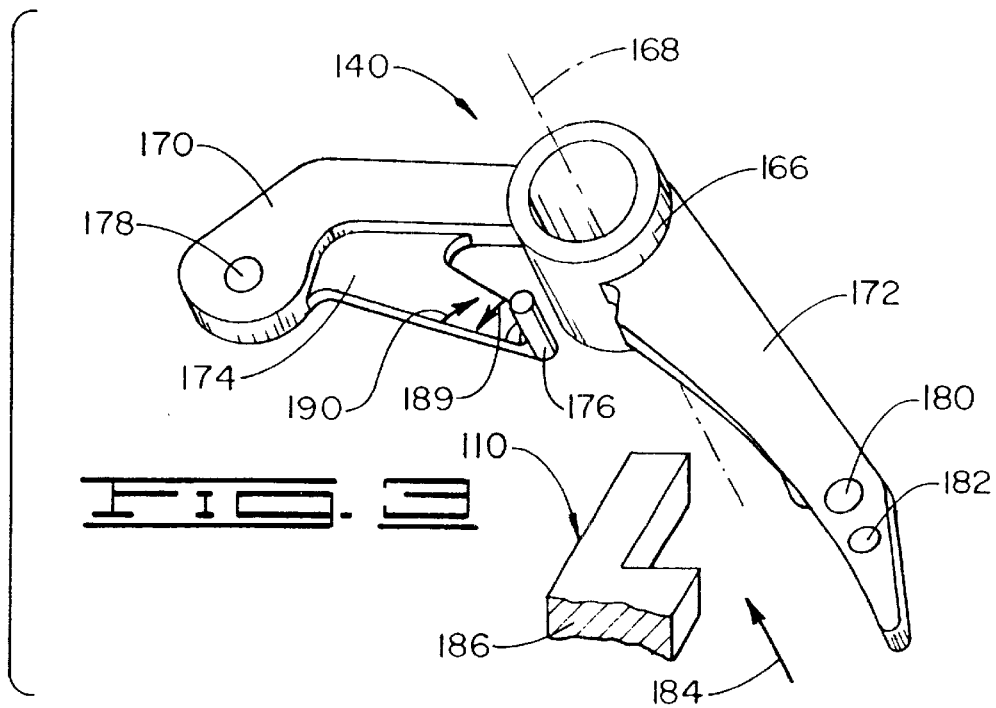
FIG. 3 is a perspective view of the inertial spring latch assembly of FIG. 1.

Accordingly, the present actuator latch 140 is provided. As depicted in FIG. 3, the actuator latch 140 comprises a latch body 166 pivotable about a pivot axis 168. The latch body 166 has a forward arm 170 and a trailing arm 172 extending in opposite directions from the pivot axis 168. The forward arm 170 further includes a spring member 174 extending therefrom and toward the pivot axis 168. The spring member 174 includes a contact post 176 disposed at a distal end and proximate the pivot axis 168. A first ferromagnetic member 178 is disposed at a distal end of the forward arm 170. A second ferromagnetic member 180 and a third ferromagnetic member 182 are disposed adjacent one another at a distal end of the trailing arm 172. In a preferred embodiment, each of the three ferromagnetic members (178, 180 and 182) comprise stainless steel ball bearings.

The first ferromagnetic member 178 is supported by the forward arm 170 at a distal end of the forward arm 170, and is disposed between the pair of pole pieces 130. During non-operation of the data storage device 100, the first ferromagnetic member 178 is positioned adjacent the edge 133 of the magnet 132 to interact with the magnet 132 to retain the actuator latch 140 from interfering with the actuator coil 114 in order to maintain the actuator assembly 110 in an unlatched position during operation of the data storage device 100.

The second ferromagnetic member 180 and the third ferromagnetic member 182 are adjacent one another and are supported on a distal end of the trailing arm 172. The distal end of the trailing arm 172 and the pair of ferromagnetic members, 180 and 182, are disposed between the pair of pole pieces 130 and interact with magnet 132 to secure the actuator assembly 110 in a latched position during non-operation of the data storage device 100. In the latched position, the pair of ferromagnetic members, 180 and 182, protrude beyond the edge 133 of the magnet and are positioned adjacent the surface 135 of the magnet 132. A peak holding force available for application to the pair of ferromagnetic members, 180 and 182 is greatest at the edge 133 of the magnet 132. However, the pair of ferromagnetic members, 180 and 182, protrude beyond the edge 133 and are positioned adjacent the surface 135 of the magnet 132 so that the amount of motion or distance the actuator latch 140 can move while maintaining the actuator assembly 110 in a latched position is greatly enhanced.

During an un-latching procedure, both of the ferromagnetic members, 180 and 182 must break through the peak holding force of the magnetic flux at the edge 133 before the actuator assembly 110 is free to operate. This dual breakout of the ferromagnetic members, 180 and 182 from the position of being adjacent the surface 135, while latching the actuator assembly 110, past the edge 133 of the magnet 132 enhances the ability of the data storage device 100 to sustain an application of an induced non-operating mechanical shock.

In a preferred embodiment, the combined mass of the pair of ferromagnetic members, 180 and 182, is substantially the same as the mass of the first ferromagnetic member 178. The mass of the first ferromagnetic member 178 is data storage device 100 dependent. That is the mass depends on the characteristics of the specific data storage device 100 and the operating and non-operating mechanical shock exposure levels specified for the data storage device 100. The performance characteristics of the single ferromagnetic member 178 compared to the performance characteristics of the pair of ferromagnetic members, 180 and 182, will be dealt with in greater detail during the discussion of FIG. 5.

To facilitate discussion of the operation of the actuator latch 140, reference is made to FIGS. 1 and 3. Although FIG. 1 shows the latch 140 in the latched position, it will be understood that during normal operation the latch 140 will be in the unlatched position. To latch the actuator assembly 110, the voice coil motor assembly 116 is powered to move the actuator assembly 110 from the data tracks (not shown) to the landing zone 126. As the actuator assembly 110 moves in a direction 184 toward the inner diameter of the disc 108, pair of ferromagnetic members, 180 and 182, provide a magnetic attraction to the magnetic field created by the magnet assembly 128.

It should be noted that a relatively high contact force results when an actuator assembly 110 contacts the actuator latch 140 as it is being latched. In the present invention, the spring member 174 effectively dampens some of the effects of the high contact force. In particular, a contact arm 186 on the actuator assembly 110 is decelerated upon engaging the contact post 176 of the spring member 174. When the contact arm 186 impacts the contact post 176, the contact post 176 and the spring member 174 deflect towards each other as shown by arrows 189, 190, respectively to inhibit movement of the actuator assembly 110 by damping the impact of the contact arm 186 with the contact post 176. Therefore, the deflections effectively reduces the contact forces created by the deceleration of the actuator assembly 110 as the actuator assembly 110 is transitioned to its latched position. The spring effect, or deflection of both the spring member 174 and the contact post 176 thereby reduces damage to the actuator assembly 110 when it is being latched. It should also be noted that a gap exists between the contact arm 186 and the contact post 176 once the actuator assembly 110 has reached the latched position. As the actuator contact arm 186 contacts the contact post 176, the actuator assembly 110 continues to advance the read/write head 122 to a parked position with the read/write head 122 coming to rest on the landing zone 126. With the advancement of the read/write head 122 to the parked position, the actuator latch 140 rotates to bring the second and third ferromagnetic members, 180 and 182, past the edge 133 and into a position adjacent the surface 135 of the magnet 132 of the magnet assembly 128 to secure the actuator latch 140 in the latched position.

Continuing with FIGS. 1 and 3, to unlatch the actuator assembly 110, the actuator coil 114 is powered to move the actuator assembly 110 from landing zone 126 to the data regions at the outer diameters of the discs 108. The force created by powering the actuator coil 114 is calculated to be sufficient to overcome the magnetic attraction of the second and third ferromagnetic members, 180 and 182, to the magnet 132. In particular, as the actuator assembly 110 moves the read/write head 122 from the circular landing zone 126 of the discs 108 to the data recording surface 124, the second and third ferromagnetic members are simultaneously moved from a position adjacent the surface 135 through the flux field at the edge 133 of the magnet 132. Again, the flux field has its highest flux gradient at the edge 133. With the movement of the pair of ferromagnetic members, 180 and 182, beyond the reaches of the magnetic flux gradient provided by the magnet 132, the holding force provided by the magnetic flux field to retain the actuator latch 140 correspondingly diminishes. In concert with the movement of the pair of ferromagnetic members, 180 and 182, away from the retention force of the magnetic flux gradient, the first ferromagnetic member 178 of the forward arm 170 is moved into a position adjacent the edge 133 of the magnet 132 and into cooperation with the retention force of the magnetic flux gradient, to retain the actuator latch 140 from interfering with the actuator coil 114 in order to maintain the actuator assembly 110 in an unlatched position during operation of the data storage device 100.

Turning now to FIG. 4, the second and third ferromagnetic members, 180 and 182, are depicted in the latched position. In other words, adjacent the surface 135 of the magnet 132. It is well known to those of ordinary skill in the art that a ferromagnetic body positioned in a non-uniform magnetic field has a force exerted on it such that it is attracted to the region of the largest flux gradient. The largest flux gradient is near the edge 133 of the magnet 132. Therefore, placement of the second and third ferromagnetic members 180, 182 inboard from the edge 133, creates a force shown by arrows 192 which allows the actuator latch 140 to remain in the latched position. In particular, the second and third ferromagnetic members 180, 182 resist the rotation of the actuator latch 140.

To illustrate, FIG. 5 shows graphical representations of retention force (y-axis 194) versus position (x-axis 196) for the first ferromagnetic member 178 and for the pair of ferromagnetic members, 180 and 182, by curves 198 and 200, respectively. For reference, curve 198 represents the use of the first ferromagnetic member 178 retaining the actuator latch 140 clear from the rotational path of the actuator assembly 110 during operation of the data storage device 100, while the curve 200 represents the use of the pair of ferromagnetic members, 180 and 182, for latching the actuator assembly 110 during non-operation of the data storage device 100. It is noted that the retention force is directly proportional to the mass of the ferromagnetic member. Therefore, the larger the mass of the ferromagnetic member or members, the greater the retention force of the actuator latch 140 to remain in the latched position during non-operation of the data storage device 100 and in the un-latched position during operation of the data storage device 100. However, space limitations in the actuator latch 140 inhibit the inclusion of a relatively large ferromagnetic member. Moreover, upon application of a mechanical shock upon the data storage device 100, a high retention force for a short period of time may be insufficient to withstand the mechanical shock.

As shown in FIG. 5, although an ultimate higher retention force is achieved by the use of the first ferromagnetic member 178 adjacent the edge 133 of the magnet 132, as seen by curve 198, using two ferromagnetic members, such as the pair of ferromagnetic members, 180 and 182, results in a larger plateau effect. In particular, curve 200 shows that the actuator latch 140 resists mechanical shock to remain in the latched position for a greater distance and for a longer duration of time as the actuator latch 140 moves from the edge 133 of the magnet 132, where the largest flux gradient exists, to the latched position reaching a uniform magnetic field. It should be noted that optimizing the location of the ferromagnetic members 180, 182 can further improve the retention force of the actuator latch 140.

It is advantageous to limit rotational travel of the actuator assembly 110 so as to constrain the radial position of the read/write head 122 to locations within the data recording surface 124. Otherwise, the read/write head 122 can easily be damaged if the read/write head 122 inadvertently travels off the edge of the discs 108 or into the spindle motor 106. To constrain the radial position of the read/write head 122 to locations within the data recording surface 124, the voice coil motor assembly 116 is supported on the base deck 102 by a pair of compressive limit stops 202 (FIG. 1), as constructed in accordance with preferred embodiments of the present invention.

Turning now to FIG. 6, depicted therein, the pair of compressive limit stops 202 are disposed on opposite ends of the pole pieces 130, thereby separating the pole pieces 130 while supporting the voice coil motor assembly 116. The compressive limit stops 202 each comprise a rigid body 204 and a compressive sleeve 206 disposed thereupon. The rigid body 204 threadingly engages the base deck 102 to support the pole pieces 130 within the HDA 101. In a preferred embodiment, the compressive sleeve 206 is formed from a suitable flexible and compressive material, such as polycarbonate.

The rigid body 204 further comprises top and bottom flange portions 208, 300 pressingly engaging the top and bottom poles 130, respectively. An inner portion 302 is disposed between the top and bottom flange portions 208, 300 so that the inner portion 302 forms a channel 304 extending about the rigid body 204. An inner wall 305 of the sleeve 206 encloses the channel 304 to form a gap between the inner wall 305 and the inner portion 302.

It has been found to be advantageous to avoid abrupt stoppage of the actuator assembly 110, as abruptly stopping the actuator can set up vibrations, which can cause the read/write head 122 to slap against the disc 106. Therefore, as shown in FIG. 7, as the actuator assembly 110 contacts either compressive limit stop 202, the compressive sleeve 206 deflects to decelerate the rotational travel of the actuator assembly 110, to reduce the potential for damage to the actuator assembly 110 and the disc 106.

Normally, the deflection of the compressive sleeve 206 into the channel 304 will be sufficient to fully decelerate the actuator assembly 110. When the actuator assembly 110 is brought into contact with the compressive limit stops 202 at a particularly high terminal velocity, however, the compressive sleeve further advantageously operates to first deflect into the channel 304 until the compressive sleeve 206 contacts the inner portion 302, after which the compressive sleeve 206 is compressed between the actuator 110 and the inner portion 302. The deflection and compression characteristics of the compressive sleeve 206 are selected accordingly to safely decelerate the actuator assembly 110 over a desired range of possible terminal velocities, more specifically over the range of impact forces developed by the mass of the actuator assembly 110 traveling over the desired range of possible terminal velocities. Hence, the compressive limit stops 202 are disposed to assure the read/write head 122 is constrained between an inner extent and an outer extent of travel of the read/write head 122 to effectively reduce the stopping distance of the actuator assembly 110. The dual function of the compressive limit stops 202 meets the current space constraints of the data storage device 100 without adding significant mass.

In view of the foregoing, it will now be understood that the present invention is directed to an apparatus for latching the actuator and limiting the rotational travel of the actuator. As exemplified by preferred embodiments, a data storage device, such as 100, has an actuator assembly, such as 110, which has a coil, such as 114, immersed in a magnetic field established by a magnetic circuit of a voice coil motor, such as 116. An actuator latch, such as 140, is provided for latching the actuator assembly. The actuator latch has a latch body, such as 166, pivotable about a pivot axis, such as 168, between a latched position and an unlatched position and disposed in a gap between upper and lower pole pieces, such as 130. A forward arm, such as 170, extends from the latch body in a first direction away from the pivot axis and comprises a first ferromagnetic member, such as 178, which interacts with the magnetic circuit to attract the latch body to an unlatched position. A trailing arm, such as 172, extends from the latch body in a second direction away from the pivot axis, so that the forward arm and the trailing arm extend on opposite sides of the pivot axis. The trailing arm comprises second and third ferromagnetic members, such as 180 and 182, which interact with the magnetic circuit to secure the latch body in the latched position. A spring member, such as 174, extends from the latch body and comprises a contact post, such as 176, whereby the spring member deflects when the actuator assembly is brought to a latched position and to dissipate kinetic energy of the actuator assembly.

A compressive limit stop, such as 202, for supporting a magnetic circuit on a base deck, such as 102, of the data storage device and limiting rotational travel of the actuator assembly is provided. The compressive limit stop comprises of a rigid body, such as 204, disposed within the base deck, which supports top and bottom pole pieces, such as 130, of a magnetic circuit on the base deck. A compressive sleeve, such as 206, is disposed about the rigid body and deflects upon impact of the actuator assembly so that the compressive sleeve and the rigid body act in conjunction to decelerate and thereby limit the rotational travel of the actuator assembly.

It is clear that the present invention is well adapted to attain the ends and advantages mentioned as well as those inherent therein. While presently preferred embodiments of the invention have been described for purposes of disclosure, it will be understood that numerous changes may be made which will readily suggest themselves to those of ordinary skill in the art and which are encompassed within the spirit of the invention disclosed and as defined in the appended claims.

What is claimed is:

1. An inertial spring latch with a contact post for latching an actuator assembly of a data storage device, the actuator assembly having a contact arm cooperating with the contact post to restrict movement of the actuator assembly, the inertial spring latch comprising:

a latch body adjacent the actuator assembly;

a forward arm extending in a first direction from the latch body; and a spring member extending from the forward arm, the spring member supporting the contact post wherein the contact post deflects upon impact of the contact arm with the contact post.

2. The inertial spring latch of claim 1, in which the contact post inhibits movement of the actuator assembly upon contact of the contact arm with contact post.

3. The inertial spring latch of claim 1, in which the contact post decelerates movement of the actuator assembly upon impact of the contact arm with the contact post.

4. The inertial spring latch of claim 1, in which the spring member deflects upon impact of the contact arm with the contact post.

5. The inertial spring latch of claim 1, in which both the contact post and the spring member deflect upon contact of the contact arm with the contact post.

6. A data storage device, comprising:

a basedeck;

spindle motor attached to the basedeck;

a disc with a recording surface supported by the spindle motor;

an actuator assembly with a contact arm and an attached read/write head, the actuator assembly adjacent the disc and secured to the basedeck;

a magnet assembly cooperating with the actuator assembly position-controlling the read/write head while recording data to and reading data from the recording surface, the magnetic assembly having a pair of pole pieces with a magnet secured to one of the pair of pole pieces;

an inertial spring latch cooperating with the contact arm in conjunction with the magnetic assembly for latching the actuator assembly, the inertial spring latch comprising:
a latch body adjacent the magnet assembly;
a forward arm extending in a first direction from the latch body;
a spring member extending from the forward arm;
a contact post supported by the spring member, the contact post restraining movement of the actuator assembly during non-operation of the data storage device;
a first ferromagnetic member supported by the forward arm disposed between the pair of pole pieces interacting with the magnet to maintain the actuator assembly in an un-latched position during operation of the data storage device; and
a trailing arm with a pair of ferromagnetic members at a distal end of the trailing arm, the trailing arm extending in a second direction from the latch body, the ferromagnetic members disposed between the pair of pole pieces interacting with the magnet to secure the actuator assembly in a latched position during non-operation of the data storage device.

7. The data storage device of claim 6, in which the magnet has an edge surface and in which the first ferromagnetic member is adjacent the edge surface while maintaining the actuator assembly in the un-latched position during operation of the data storage device.

8. The data storage device of claim 6, in which the magnet has an edge surface and a face surface, wherein the face surface is substantially perpendicular to the edge surface and in which the pair of ferromagnetic member's are adjacent the face surface of the magnet to secure the actuator assembly in the latched position during non-operation of the data storage device.

9. The data storage device of claim 6, in which the contact post inhibits movement of the actuator assembly upon contact of the contact arm with contact post.

10. The data storage device of claim 6, in which the contact post decelerates movement of the actuator assembly upon impact of the contact arm with the contact post.

11. The data storage device of claim 6, in which the contact post deflects upon impact of the contact arm with the contact post.

12. The data storage device of claim 6, in which the spring member deflects upon impact of the contact arm with the contact post.

13. The data storage device of claim 6, in which both the contact post and the spring member deflect upon contact of the contact arm with the contact post.

14. A data storage device, comprising:
a basedeck;
spindle motor attached to the basedeck;
a disc with a recording surface supported by the spindle motor;
an actuator assembly with a contact arm and an attached read/write head, the actuator assembly adjacent the disc and secured to the basedeck;
a magnet assembly cooperating with the actuator assembly position-controlling the read/write head while recording data to and reading data from the recording surface, the magnetic assembly having a pair of pole pieces with a magnet secured to one of the pair of pole pieces; and
the actuator assembly latched by means for latching the actuator assembly.

15. A data storage device, comprising:
a basedeck;
spindle motor attached to the basedeck;
a disc with a recording surface supported by the spindle motor;
an actuator assembly with a contact arm and an attached read/write head, the actuator assembly adjacent the disc and secured to the basedeck;
a magnet assembly cooperating with the actuator assembly position-controlling the read/write head while recording data to and reading data from the recording surface, the magnetic assembly having a pair of pole pieces with a magnet secured to one of the pair of pole pieces;
a latch body adjacent the magnet assembly;
a forward arm extending in a first direction from the latch body;
a spring member extending from the forward arm;
a contact post supported by the spring member, the contact post restraining movement of the actuator assembly during non-operation of the data storage device;
a first ferromagnetic member supported by the forward arm disposed between the pair of pole pieces interacting with the magnet to maintain the actuator assembly in an un-latched position during operation of the data storage device; and
a trailing arm with a pair of ferromagnetic members at a distal end of the trailing arm, the trailing arm extending in a second direction from the latch body, the ferromagnetic members disposed between the pair of pole pieces interacting with the magnet to secure the actuator assembly in a latched position during non-operation of the data storage device.

16. The data storage device of claim 15, in which the magnet has an edge surface and in which the first ferromagnetic member is adjacent the edge surface while maintaining the actuator assembly in the unlatched position during operation of the data storage device.

17. The data storage device of claim 15, in which the magnet has an edge surface and a face surface, wherein the face surface is substantially perpendicular to the edge surface and in which the pair of ferromagnetic member's are adjacent the face surface of the magnet to secure the actuator assembly in the latched position during non-operation of the data storage device.

18. The data storage device of claim 15, in which the contact post inhibits movement of the actuator assembly upon contact of the contact arm with contact post.

19. The data storage device of claim 15, in which the contact post decelerates movement of the actuator assembly upon impact of the contact arm with the contact post.

20. The data storage device of claim 15, in which the contact post deflects upon impact of the contact arm with the contact post.

21. The data storage device of claim 15, in which the spring member deflects upon impact of the contact arm with the contact post.

22. The data storage device of claim 15, in which both the contact post and the spring member deflect upon contact of the contact arm with the contact post.

* * * * *